J. PEIRSON.
Grain-Drill.
No. 5,655.
Patented July 5, 1848.
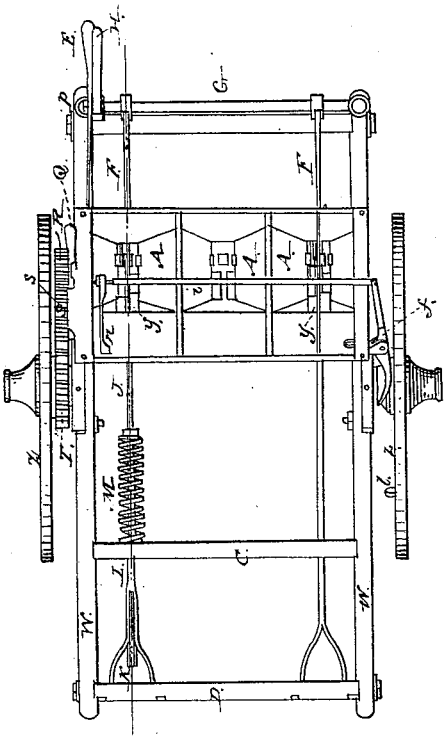
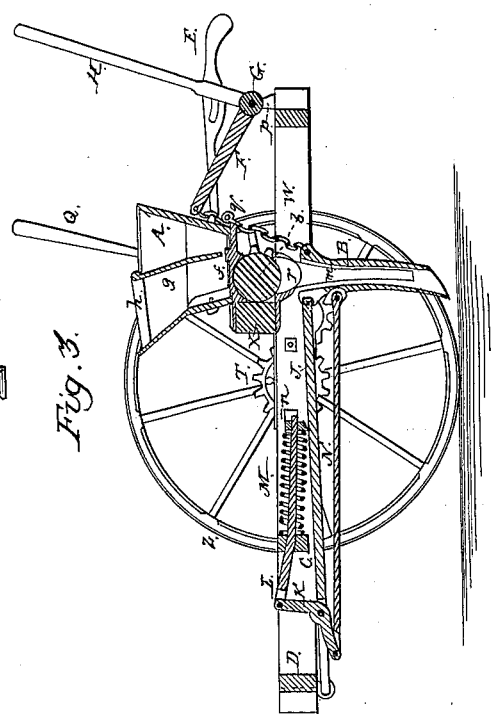
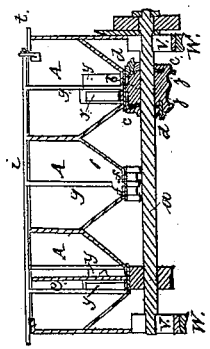
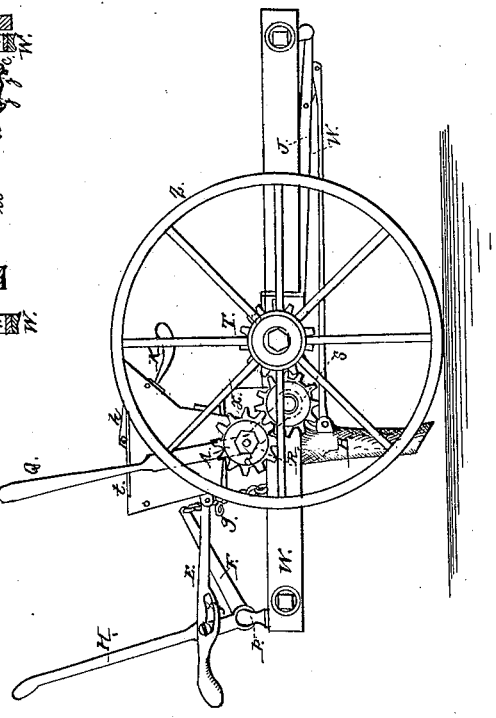

UNITED STATES PATENT OFFICE.

JACOB PEIRSON, OF WILMINGTON, DELAWARE.

IMPROVEMENT IN SEED-PLANTERS.

Specification forming part of Letters Patent No. 5,655, dated July 5, 1848.

*To all whom it may concern:*

Be it known that I, JACOB PEIRSON, of Wilmington, in the county of New Castle and State of Delaware, have invented sundry new and useful Improvements in Grain or Seed Planters; and I do hereby declare the following to be a full, clear, and exact description thereof, reference being had to the accompanying drawings, making a part of this specification.

Figure 1 is a top view of my improved planter; Fig. 2, a side elevation thereof; Fig. 3, a longitudinal vertical section, and Fig. 4 a transverse section. Fig. 5 is a side elevation of the planting-roller detached from the machine.

Similar letters indicate like parts in all the figures.

The frame of the planter is constructed of the side pieces, W W, connected by suitable transverse pieces, and rests upon the wheels Z Z, the bearing-axles of which are made fast to the sides of the planter-frame. The series of hoppers A A, in which the grain is placed preparatory to planting, are secured to the transverse piece X, bolted to the upper side of the frame. The planting-axle $a$ passes under the center of the hoppers A A and works in the bearings V V, Fig. 4, secured to the upper edges of the side pieces, W W.

Planting-rollers $b$ are secured to the axle $a$, of the form represented in Figs. 4 and 5. Each planting-roller $b$ has a double series of planting-recesses, $jj$, which revolve under apertures in the bottom of the hopper. The apertures in the base of the hoppers can be opened and closed at pleasure by means of gates $ff$, operated by the handles $gg$.

The recesses $jj$ in the rollers $b$, for receiving and depositing the seeds or kernels of grain, can be varied in form and increased or diminished in size to adapt them to different descriptions of grain, or to regulate the quantity deposited at a time, in the manner represented in Figs. 4 and 5, and described as follows:

Longitudinal grooves or recesses $jj$ are cast or formed in the periphery of the planting-rollers, commencing a short distance each side of the center thereof and extending outward to each end.

$cc$ are circular collars sliding freely on the axle $a$, having projections $ss$, which fit accurately into the recesses or grooves in the periphery of the planting-rollers. The collars $cc$ are secured to the ends of the planting-rollers and can be moved out or in by means of the set-screws $dd$.

By turning the set-screws the recesses $jj$ in the planting-rollers can be elongated or shortened at pleasure by the action of the projections $ss$ working in the same.

When it is desired to deposit any kind of pulverized manure with the grain in planting, I divide the hoppers in the center by the partitions $e$, as seen in Fig. 4, and place manure in one portion and grain in the other, and regulate the size of the planting-recesses in the rollers $b$ to suit each substance.

$yy$ are brushes placed at one end of the apertures in the base of the hoppers A, to prevent the kernels of grain from being broken as they are removed by the recesses in the planting-rollers.

A funnel, $r$, is placed under each planting-roller, (secured to the transverse piece X,) which receives the grain from the planting-rollers. A flexible tube, $m$, is connected to the funnel $r$, which passes into the hollow planting-tube B. Each planting-tube B is connected to the planter-frame, as represented in Figs. 1 and 3.

J is a draft-bar, the rear end of which is jointed to the front side of B at its upper extremity. At its front end the bar J is forked, and the extremity of each fork is jointed to eyes descending from the front transverse piece, D, of the frame.

Between the prongs of the fork, at the front end of J, there is placed a bell-crank, K, secured by a joint-pin passing through the prongs. The upper end of the vertical portion of K is jointed to the rod L, which passes to the rear through an aperture in the transverse frame-piece C.

Between the nut $n$ at the rear end of the bar L and the transverse piece C of the frame there is placed a stiff helical spring, M, which acts powerfully upon the bell-crank K. The lower portion of the bell-crank K inclines slightly downward from the line of the draft-bar J to the extremity of the lower or front portion of K. The bar N is jointed, and the rear extremity of N is jointed to the front side of the planting-tube B, a few inches below the connecting-joint, between the draft-bar J and B. The object of this compound connection of the planting-tube with the draft-bar J is to enable the tube to relieve itself when it strikes an obstruction, and yet gives it so firm a support that the tube will not deviate from its proper position unless it strikes some immovable obstacle.

It will be perceived that when the bell-crank K is in the position represented in Fig. 3 there is so small an amount of leverage for the bar N to act upon the vertical portion of K and overcome the power of the spring M that a steady draft will not move the bell-crank, and that nothing short of a blow will overcome the spring M which acts upon it. After once acting upon the bell-crank the leverage increases, as its lower portion descends to a vertical position to allow the planting-tube to relieve itself from any obstruction. The planting-tubes are elevated into the position represented in the drawings (for the purpose of raising their points clear of the ground for transporting from place to place) by means of the rock-shaft G, placed on the rear end of the planter-frame, between the supports $p\ p$, the arms F F, projecting forward from G and connected by chains to the planting-tubes, the lever H, connected to one end of G, the retaining-bar E, jointed to the hopper-frame and projecting to the rear, in which is a curved slot, $z$, that receives the head of the pin $v$, projecting from the side of the lever H. The slot $z$ has an abrupt upward recess at its rear end, that receives the pin $v$ when the lever H is thrown back, and thereby retains the planting-tubes in an elevated position.

When it is desired to depress the planting-tubes the rear end of E is elevated and the lever H thrown forward. Motion is communicated to the shaft $a$ by means of the pinion T, attached to the inner end of the hub of one of the wheels, matching into the intermediate pinion S, which matches into the pinion R on the end of the shaft $a$. The axis of the pinion S is attached to the lower extremity of the lever Q. The shaft $a$ passes through and supports the lever Q, and on which it can be freely vibrated when it is desired to throw the pinion R in or out of gear with the driving-pinion T. Notches in the ledge $t$ projecting from the hopper-frame receive the lever Q and retain the intermediate pinion, S, either in or out of gear with the driving-pinion. I stir up the grain (or manure) in the hoppers to prevent it from clogging by means of the rod $i$, resting on the top of the hopper-frame, from which descend the arms $g$ into each hopper, which are operated upon as follows: One end of the rod $i$ is made fast to the spring $h$, secured to one end of the hopper-frame, and the other to the vibrating lever $k$, connected to the opposite end of the hopper-frame. When the wheels are revolved the stop $l$, Fig. 1, made fast to one of the spokes, will strike the projecting end of the lever $k$ and impart a reciprocating movement to the rod $i$ and the stirring-arms $g\ g$ descending therefrom.

What I claim as my invention, and desire to secure by Letters Patent, is—

1. The constructing of the planting-rollers in such a manner that the recesses in their peripheries can be varied in size and form, substantially in the manner and for the purpose herein set forth.

2. The compound manner of connecting the planting-tube B with the draft-bar J by means of the combination therewith of the rods L and N, the spring M, and bell-crank K, arranged and operating with each other substantially in the manner and for the purpose herein set forth.

JACOB PEIRSON.

Witnesses:
Z. C. ROBBINS,
W. R. JOHNSON.